United States Patent

Slechta, Jr. et al.

[11] 4,384,325
[45] May 17, 1983

[54] APPARATUS AND METHOD FOR SEARCHING A DATA BASE USING VARIABLE SEARCH CRITERIA

[75] Inventors: Leo J. Slechta, Jr., Rosemount; Bennett W. Manning, Eagan; Nancy E. Preckshot, Minneapolis; Howard M. Wagner, Roseville, all of Minn.

[73] Assignee: Sperry Corporation, New York, N.Y.

[21] Appl. No.: 161,983

[22] Filed: Jun. 23, 1980

[51] Int. Cl.³ .............................................. G06F 7/34
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,648,254 | 3/1972 | Beausoleil | 364/200 |
| 3,906,455 | 9/1975 | Houston | 364/200 |
| 4,115,850 | 9/1978 | Houston | 364/200 |
| 4,130,867 | 12/1978 | Bachman | 364/200 |
| 4,152,762 | 5/1979 | Bird | 364/200 |
| 4,221,003 | 5/1980 | Chang | 364/900 |
| 4,267,568 | 11/1980 | Dechant | 364/200 |

*Primary Examiner*—Gareth D. Shaw
*Assistant Examiner*—Stephen A. Soffen

*Attorney, Agent, or Firm*—William C. Fuess; Kenneth T. Grace; Marshall M. Truex

[57] ABSTRACT

Apparatus for and method of searching a data base using variable search criteria. The data base consists of a set of files or portions thereof. Each file is divided into a number of records whereby all records of a given file have the same format but the records of different files may have different formats. A field format register is used to define the format of the records within a given file. The field format register specifies the location and width of each field within a record. To perform a search, a field-by-field comparison of each record is made to a reference word. The comparison yields a less than, equal to or greater than result for each field of each record. A field comparison register describes the expected result of the field-by-field comparison. A given field is designated true if the comparison yields the expected result specified for that field in the field comparison register. A given field is designated false if the comparison yields other than the expected result specified in the field comparison register. A hit on a given record is defined as satisfying a Boolean expression using the field-by-field true/false definitions as input variables. A given record is a miss if the Boolean expression is not satisfied.

4 Claims, 18 Drawing Figures

0 - FIELD (0-127 COMBINATIONS)
1 - OPERATOR

Fig. 10a

0 = AND
1 = XOR
2 = OR
3 = NOT
4 = RIGHT PARENS
5 = LEFT PARENS

Fig. 10b

$\overline{A} \cdot B + B \cdot (C+D)$

Fig. 10d

|  | 15 |  | 7 |  | 0 |
|---|---|---|---|---|---|
| WORD 0 | 1 | NOT (3) | 0 | FIELD VAR (A) | |
| 1 | 1 | AND (0) | 0 | FIELD VAR (B) | |
| 2 | 1 | OR (2) | 0 | FIELD VAR (B) | |
| 3 | 1 | AND (0) | 1 | RIGHT PARENS (4) | |
| 4 | 0 | FIELD VAR (C) | 1 | OR (2) | |
| 5 | 0 | FIELD VAR (D) | 1 | LEFT PARENS (5) | |

Fig. 10c

1. READ BOOLEAN EVALUATOR MEMORY
2. FORM FLAG ADDRESS
3. READ FLAG AT COMPARE ARRAY
4. TRANSFER FLAG TO SEQUENCER
5. SELECT FLAG OR STACK
6. PERFORM BOOLEAN OPERATION

BOOLEAN EVALUATION EXAMPLE

HIT = ABC $\oplus$ $(\overline{A}+B)(A+\overline{C})$

| READ BEM (S1) | FORM FL ADDR (S2) | RD FLAG ON MABD (S3) | RD FLAG ON CSBD (S4) | SELECT OPERAND (S5) | ACC (S6) | STACK (S6) |
|---|---|---|---|---|---|---|
| A, FLAG, LOAD | — | — | — | — | — | — |
| B, FLAG, AND | A | A | — | — | — | — |
| C, FLAG, AND, PUSH | B | B | A | — | — | — |
| A, $\overline{\text{FLAG}}$, LOAD | C | C | B | A | A | — |
| B, FLAG, OR | A | A | C | B | AB | — |
| STACK(POP), XOR, PUSH | B | B | A | C/$\overline{A}$ | ABC | ABC |
| A, FLAG, LOAD | A | A | B | B | $\overline{A}$ | ABC |
| C, $\overline{\text{FLAG}}$, OR | C | C | A | ABC | $\overline{A}+B$ | — |
| STACK(POP), AND, END | X | X | — | A/$\overline{C}$ | ABC $\oplus$ $(\overline{A}+B)$ | ABC $\oplus$ $(\overline{A}+B)$ |
| | — | — | — | ABC$\oplus$($\overline{A}$+B) | A | ABC |
| | — | — | — | — | $(A+\overline{C})$ | — |
| | | | | | ABC $\oplus$ $(\overline{A}+B)(A+\overline{C})$ | |

Fig. 15

APPARATUS AND METHOD FOR SEARCHING A DATA BASE USING VARIABLE SEARCH CRITERIA

BACKGROUND OF THE INVENTION

The present invention generally relates to apparatus for and methods of searching digital bases and more specifically relates to searching through the utilization of user specified variable search criteria.

Performing complex searches using general purpose processors can prove quite inefficient if multiple instructions are required to operate upon each field of each record. Yet the search tasks may be quite simple in nature and very repetitive in relation to the normal tasks accomplished by general purpose processors. A special purpose processor can be designed which will efficiently search a given large data base. Such special purpose processors are common in the communication industry, for example. Most such processors, however, are not sufficiently flexible to be applied to a wide range of data base search problems.

SUMMARY OF THE INVENTION

The present invention has a number of features which greatly enhances the flexibility of efficient data base searches. A field format register permits the format of each record of a file to be specified by the user. This field format register specifies the width (i.e., how many bytes) and location (i.e., which bytes) of each field in a record. Thus, enhanced flexibility is available in defining the format of the information within the data base.

A second important feature of the present invention is the comparison of each record on a field-by-field basis to a reference word. This comparison yields an indication of whether a field is less than, equal to or greater than the corresponding field of the reference word. This indication (i.e., less than, equal to, or greater than) is compared against an expected result for that field. The expected result (i.e., less than, equal to, or greater than) is stored in the field comparison register on a field-by-field basis. If the indication for a field following comparison is the same as the expected result, that field of that record is defined to be true. If the indication and the expected result are different, that field of that record is defined to be false.

The actual hit or miss determination for a given record is made by determining whether a Boolean Expression supplied by the user is or is not satisfied by the true and false determinations of the fields within that record. This feature provides great flexibility in specifying very complex searches, because it permits a logical relationship amongst the individual field-by-field arithmetic comparisons. The Boolean expression is executed using the true and false determinations of each record as inputs.

DETAILED DESCRIPTION OF THE PREFERRED EMBODIMENT

The preferred embodiment of the present invention has been incorporated into a product of the assignee of this invention. The product is called the High Speed Search Function. Other aspects of the detailed construction may be found in the related United States patent applications entitled, High Speed Data Base Search System, Ser. No. 161,993 and Variable Speed Synchronous Clock, Ser. No. 161,987 also assigned to the assignee of this invention.

Figure 1:
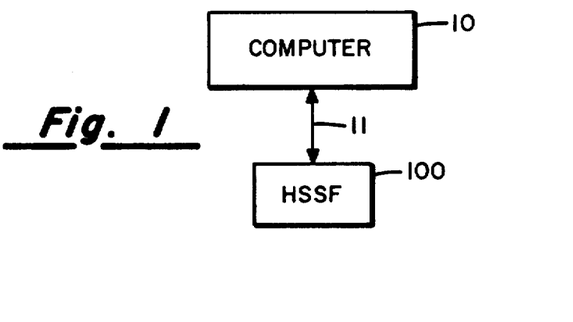
FIG. 1 shows the High Speed Search Function in its outboard configuration.

FIG. 1 shows the High Speed Search Function, HSSF 100, employed in the outboard configuration. HSSF 100 is coupled to COMPUTER 10 via Input/Output cable 11. In the outboard configuration, HSSF 100 appears to COMPUTER 10 as a peripheral device. The outboard configuration is most desirable for systems in which COMPUTER 10 is in existence and no physical changes are deemed desirable. The primary disadvantages of the outboard configuration are the bandwidth limitation imposed on the INPUT/OUTPUT Cable 11 and the software overhead within COMPUTER 10 required to communicate with HSSF 100 as a peripheral device.

Figure 2:
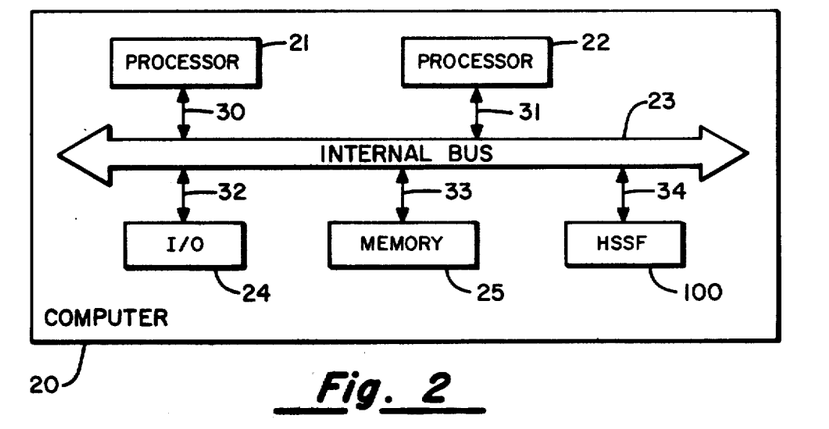
FIG. 2 shows the High Speed Search Function in its inboard configuration.

FIG. 2 shows HSSF 100 used in the inboard configuration. As can be seen, HSSF 100 is located physically within COMPUTER 20. In this configuration, HSSF 100 is provided with input power and structural support from COMPUTER 20. Other resources may be shared as well. The most significant advantages of the inboard configuration accrue from the communication path between HSSF 100 and the other elements of COMPUTER 20. Through the use of INTERNAL BUS 23, HSSF 100 communications with PROCESSOR 21 and 22, I/O 24, and MEMORY 25. By using INTERNAL BUS 23, the bandwidth and control structure may be optimized to produce the highest performance with the lowest software overhead.

Figure 3:
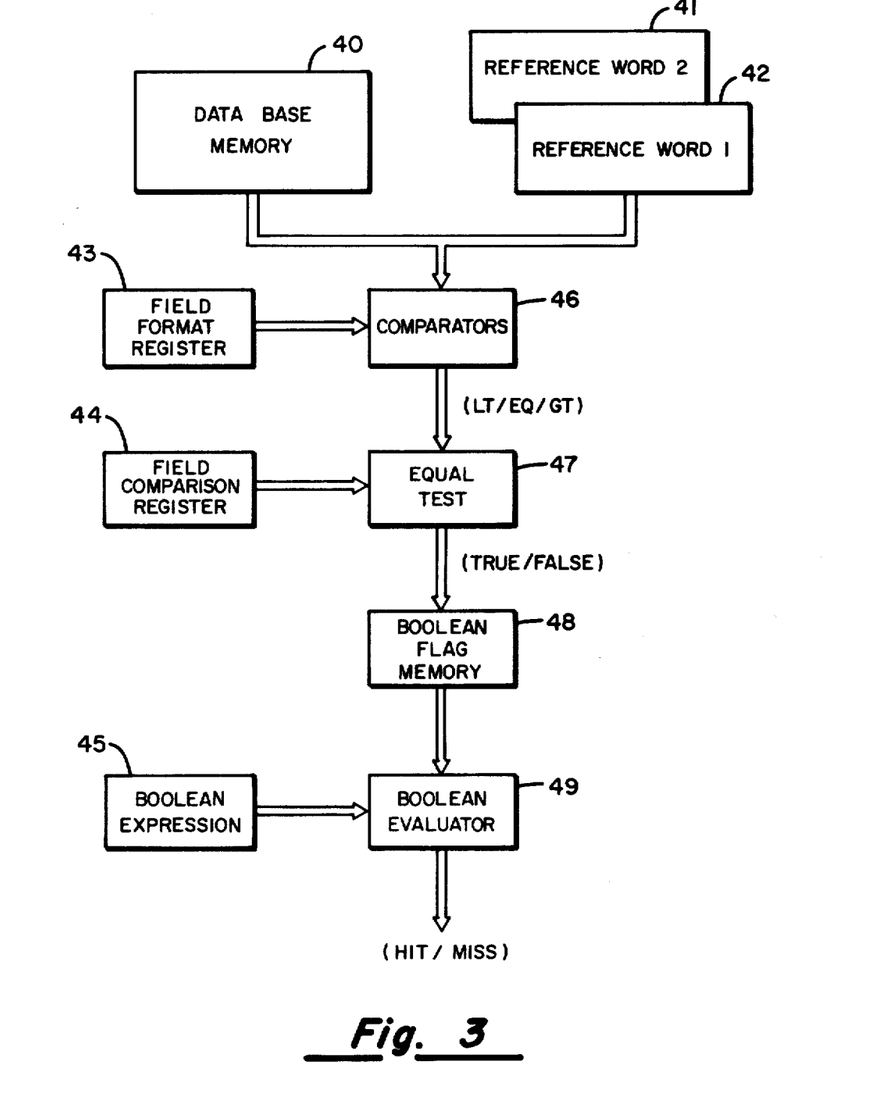
FIG. 3 shows the operation of a complex search.

FIG. 3 shows the overall operation of HSSF 100. Notice that the operation is the same whether HSSF 100 is employed in the inboard or the outboard configuration. The entire data base to be searched is loaded into DATA BASE MEMORY 40. Usually this will be a complete file, though partial files may be searched with some degradation in overall system performance. DATA BASE MEMORY 40 has one addressable location for each of the records to be searched. Therefore, the basic word size (in bits) of DATA BASE MEMORY 40 must be at least equivalent to the record size (in bits). REFERENCE WORD 1 42 and REFERENCE WORD 2 41 each store an entire record. For normal searches, only REFERENCE WORD 1 42 is used. For range searches, both are used permitting "within range" and "without range" comparisons.

FIELD FORMAT REGISTER 43 defines the format of each record of the file (in DATA BASE MEMORY 40) and the REFERENCE WORD(s). It is assumed that all records during a given search have the same format. However, because FIELD FORMAT REGISTER 43 is loaded to initiate a search, considerable format flexibility is achieved. As a practical consideration, FIELD FORMAT REGISTER 43 is byte oriented rather than bit oriented and defines each field of a record by position (in the record) and length in bytes.

COMPARATORS 46 makes an arithmetic comparison between each record from DATA BASE MEMORY 40 and the REFERENCE WORD(s). This arithmetic comparison is done on a field-by-field basis as defined by FIELD FORMAT REGISTER 43, but all fields are compared in parallel. For a normal search, arithmetic comparison yields a less than, equal to, or greater than result for each field of a record. For a range search one such indication (i.e., less than, equal to, or greater than) is produced for each REFERENCE WORD for each field of the record. By structuring DATA BASE MEMORY 40 to have one record per addressable location, making COMPARATORS 46 and the REFERENCE WORD's one record wide, and utilizing FIELD FORMAT REGISTER 43, all fields of an entire record are compared in parallel using a single read access to DATA BASE MEMORY 40.

Before initiation of a search, FIELD COMPARISON REGISTER 44 is loaded with an expected result for each arithmetic comparison on a field-by-field basis. The expected result is less than, equal to, or greater than. EQUAL TEST 47 performs a logical comparison between the field-by-field results yielded by COMPARATORS 46 (i.e., arithmetic comparison) and the expected results in FIELD COMPARISON REGISTER 44. EQUAL TEST 47 yields a true for a given field if the actual result from COMPARATORS 46 is the same as the expected result from FIELD COMPARISON REGISTER 44. The use of the arithmetic comparison followed by the logical comparison is important since the inputs (i.e., file to be searched and REFERENCE WORD(s) must be arithmetically compared to achieve the desired result, whereas the final output (i.e., hit or miss) is logical. Again COMPARATORS 46 perform an arithmetic comparison whereas EQUAL TEST 47 yields a purely logical (i.e., true or false) output.

BOOLEAN FLAG MEMORY 48 stores the true/false output of EQUAL TEST 47. The contents of BOOLEAN FLAG MEMORY 48 are used as inputs to BOOLEAN EVALUATOR 49. BOOLEAN EXPRESSION 45 is supplied at initiation of a search and is used to specify the relationship between fields during a search. BOOLEAN EXPRESSION 45 may be quite simple or quite complex. BOOLEAN EVALUATOR 49 determines whether BOOLEAN EXPRESSION 45 is or is not satisfied by the true/false indications for a record stored within BOOLEAN FLAG MEMORY 48. If BOOLEAN EXPRESSION 45 is satisfied, the record is defined as a hit. Otherwise the record is defined as a miss. Notice that even though all fields of a record are arithmetically and locally compared once and only once, a given BOOLEAN EXPRESSION may or may not make use of the results for a given field. An actual example of a comparison is discussed below.

Figure 4:
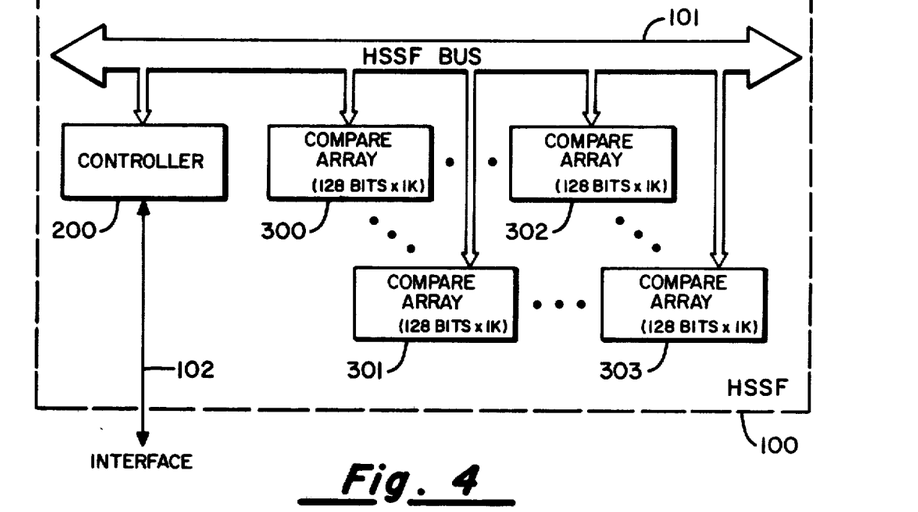
FIG. 4 shows the overall block diagram of the High Speed Search Function.

FIG. 4 shows the internal construction of HSSF 100. HSSF BUS 101 supplies the main communication path between CONTROLLER 200 and the COMPARE ARRAY's. COMPARE ARRAY 300 is the basic unit of DATA BASE MEMORY 40. It has the capacity to store a file of up to 1024 records wherein each record has up to 128 bits. To use HSSF 100 for files having more than 1024 records, additional COMPARE ARRAY's are added in the dimension of COMPARE ARRAY 301. Each COMPARE ARRAY added in that dimension provides 1024 more addressable locations, thereby providing for up to 1024 more records per file. To expand the maximum record size, COMPARE ARRAY's are added in the dimension of COMPARE ARRAY 302. Each COMPARE ARRAY added in that dimension increases the record size by 128 bits. The COMPARE ARRAY's are identical and contain the necessary hardware (e.g., portions of REFERENCE WORD 1 42, REFERENCE WORD 2 41, FIELD FORMAT REGISTER 43, COMPARATORS 46, etc.) to permit the expansion in either dimension. HSSF 100 can accommodate up to 16 COMPARE ARRAY's providing a file size of from 1,024 records of 2,048 bits each to 16,384 records of 128 bits each in increments of 1,024 records by 128 bits.

Figure 5:
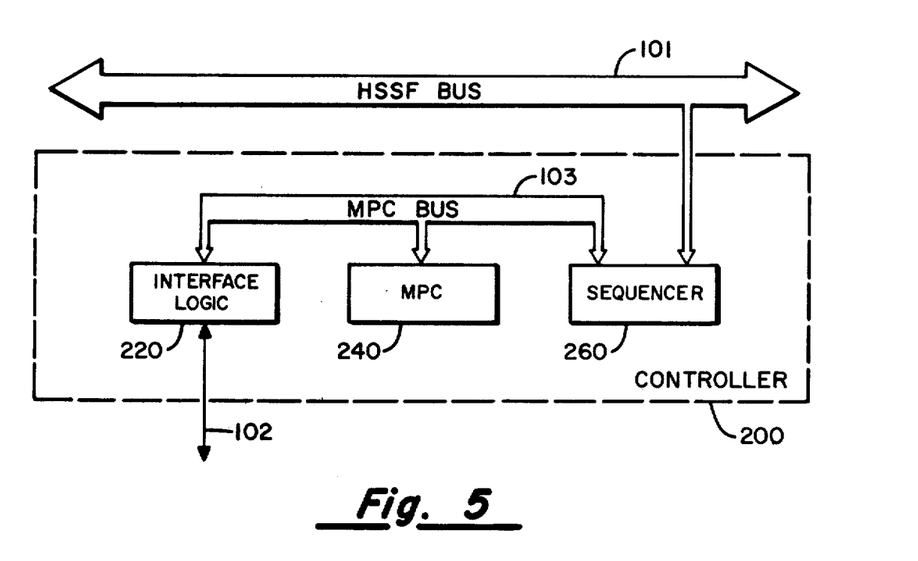
FIG. 5 is a block diagram of CONTROLLER 200.

CONTROLLER 200 contains the interface, control, and sequencing logic needed to operate HSSF 100. Cable 102 couples HSSF 100 via CONTROLLER 200 to its external environment. FIG. 5 shows CONTROLLER 200 in more detail. INTERFACE LOGIC 200 is coupled to cable 102. INTERFACE LOGIC 220 is that element which is different in the inboard and outboard configurations. INTERFACE LOGIC 220 communicates with the micro programmed controller, MPC 240, and SEQUENCER 260 via MPC BUS 103. MPC 240 provides overall control of HSSF 100 primarily for interface control, search initiation, and mode control. SEQUENCER 260 contains the hardwired circuitry which actually controls the timing of the search itself. Hardwired logic is required (instead of micro programmed logic) to meet the desired performance requirements (i.e., basic normal search cycle time of one microsecond per record).

Figure 6:
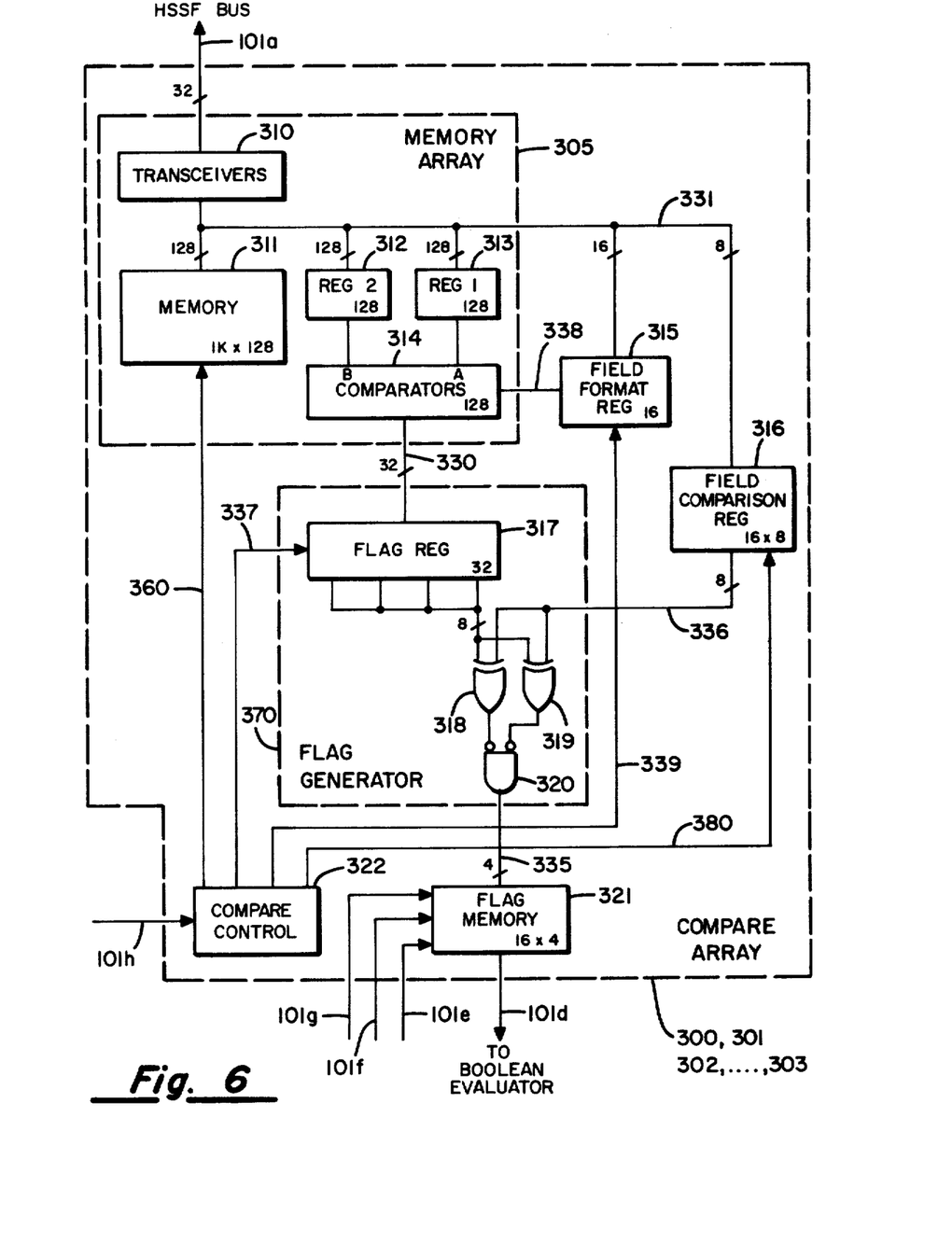
FIG. 6 is a block diagram of one COMPARE ARRAY.

FIG. 6 shows the construction of one COMPARE ARRAY. TRANSCEIVERS 310 are used to interface to HSSF BUS 101a (i.e., 32 data bits of HSSF BUS 101). MEMORY 311 actually stores the data base. It is constructed using industry standard CMOS static random access memory (RAM) devices. REG 1 313 and REG 2 312 are 128 bit registers which store the records to be compared (i.e., contents of one addressable location of MEMORY 311 in REG 2 312 and REFERENCE WORD in REG 1 313). Notice that for a range search the arithmetic comparison is simply repeated.

COMPARATORS 314 performs the arithmetic comparison between the contents of REG 2 312 and REG 1 313. FIELD FORMAT REG 315 is a 16 bit register which defines the boundaries of each field to COMPARATORS 314. Each bit position of FIELD FORMAT REG 315 corresponds to a different byte of COMPARATORS 314.

FLAG REG 317 is a 32 bit register which has two bit positions for each byte of the 128 bit words compared by COMPARATORS 314. This is necessary, since in the worst case, FIELD FORMAT REG 315 could define each byte of COMPARATORS 314 as a separate field and the arithmetic comparison yields one of three results (i.e., less than, equal to, or greater than) for each field. Exclusive-ORs 318 and 319 exclusive-OR the flags from FLAG REG 32 (i.e., the results from COMPARATORS 128) with the output of FIELD COMPARISON REG 316 (i.e., expected results). Notice that FIELD COMPARISON REG 316 is actually a RAM. The exclusive-ORing is done four bytes at a time (i.e., results of arithmetic comparison for four bytes are exclusive-ORed with expected results for those four bytes). In this manner, Exclusive-ORs 318 and 319, along with gate 320, generate true/false indications for four bytes in parallel. The true/false indications (i.e., one bit per byte) are transferred via cable 335 to FLAG MEMORY 321. The arithmetic comparison results for the remaining bytes are similarly exclusive-ORed with the expected results.

Before initiation of a search, MEMORY 311 is loaded with all or a portion of the data base. REG 1 313 is loaded with the Reference Word (note REG 1 313 is loaded twice for range searches). FIELD FORMAT REG 315 is loaded with the description of the records loaded into MEMORY 311. FIELD COMPARISON REG 316 is loaded with the expected results of the arithmetic comparison for each byte. COMPARE ARRAY 300 performs the arithmetic and logical comparisons and loads FLAG MEMORY 321 with the true/false indications for each byte.

Figure 7:
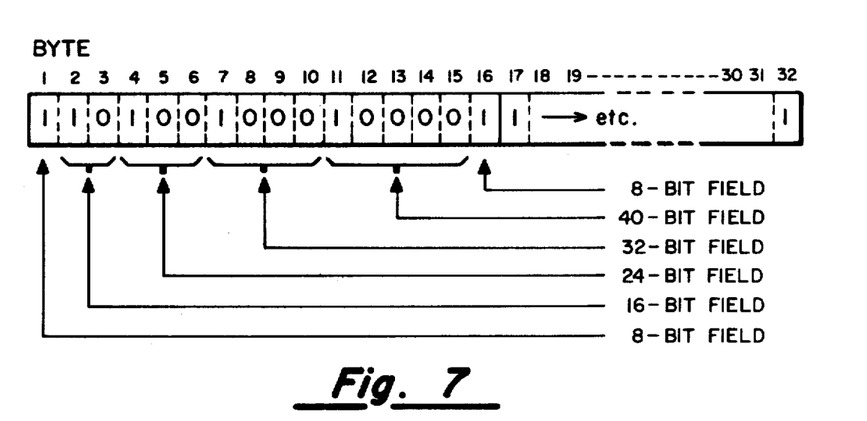
FIG. 7 shows a possible configuration of the field format register.

FIG. 7 shows the format of FIELD FORMAT REG 315. One bit position is used for each byte of the 128 bit word of the COMPARE ARRAY. As the record size is expanded, FIELD FORMAT REG 315 is effectively expanded in the same manner as DATA BASE MEMORY 40 (see also FIG. 4 and the discussions above). A binary one in a given bit position signifies that a field ends at the corresponding byte position of the records. Similarly, a binary zero in a given bit position signifies that the corresponding byte is within a field which ends at a different byte position in the record.

Figure 8:
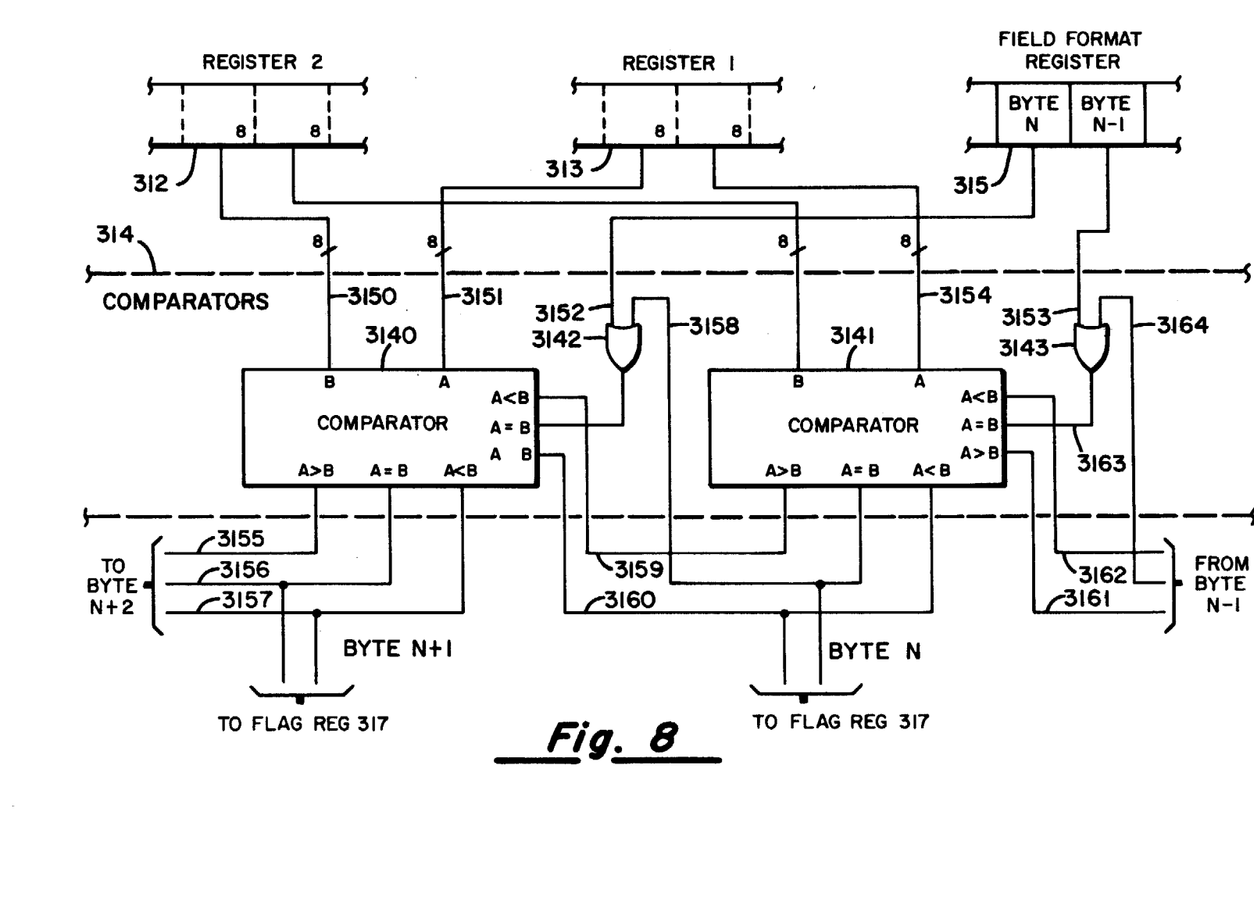
FIG. 8 shows the circuitry used to perform the field-by-field comparison.

FIG. 8 shows the manner in which fields are defined for arithmetic comparison purposes. As explained above, FLAG REG 317, FIELD COMPARISON REG 316, Exclusive-ORs 318 and 319, gate 320, and FLAG MEMORY 321 handle each byte as if it were a separate field, since in the worst case, each byte may be a field. However, field boundaries must be defined to COMPARATORS 314 to generate accurate arithmetic comparisons. COMPARATORS 314 consists of a number of simple monolithic COMPARATOR circuits 3140, 3141, . . . . Each COMPARATOR circuit (i.e., COMPARATOR circuit 3140, 3141, . . . ) is capable of performing a simple arithmetic comparison between one byte of REG 1 313 and the corresponding byte of REG 2 312. The function of FIELD FORMAT REG 315 is the tying together of adjacent bytes of COMPARATORS 314 as required. For multi-byte fields, the less than or greater than result of the most significant byte is the arithmetic comparison result for the entire field. If the most significant byte is equal, however, the result of the next most significant, not equal, byte is controlling on the entire field. Of course, if all bytes of a field are equal, the result for the field is equal.

Gates 3142 and 3143 supply the equal comparison enable to COMPARATOR 3140 (i.e., $N+1^{st}$ byte) and COMPARATOR 3141 (i.e., $N^{th}$ byte), respectively. Notice that COMPARATOR 3140 ($N+1^{st}$ byte) is enabled for equal comparison if FIELD FORMAT REGISTER 315 has the bit position set corresponding to the $N^{th}$ byte. That means that COMPARATOR 3140 is the least significant (or perhaps only) byte of a field, and should therefore, be enabled for equal comparison. COMPARATOR 3140 is also enabled for equal comparison by gate 3142 if an equal to result is received from COMPARATOR 3141 ($N^{th}$ byte). This will occur when all lesser significant bytes of a field also have an equal to result. Notice that the less than and greater than results are also propagated from less significant to more significant bytes.

As explained above, the arithmetic comparisons are made on a byte-for-byte basis in parallel. The result for each byte is propagated to FLAG REG 317 (see also FIG. 6). The function of FIELD FORMAT REGISTER 315 is to tie results of less significant bytes to more significant bytes within the same field whenever the more significant byte has an equal to result.

Figure 9:
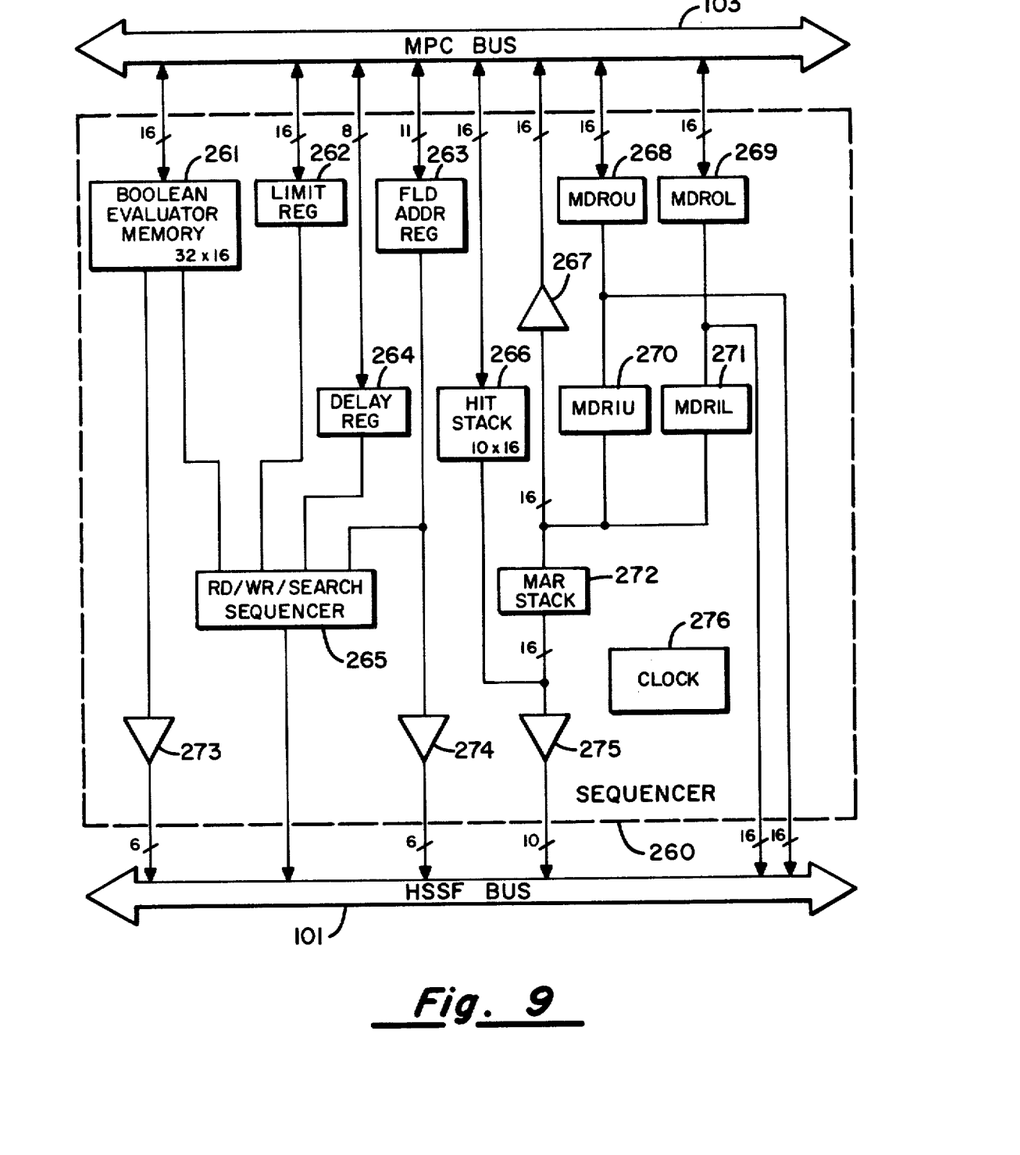
FIG. 9 is a block diagram of SEQUENCER 260.

FIG. 9 shows SEQUENCER 260 in detailed block diagram form. CLOCK 276 is used to generate the overall timing signals. The COMPARE ARRAYS are loaded and read via HSSF BUS 101 (See also FIG. 4). The major data interface is via the output memory data register, MDROU 268 and MDROL 269, and the input memory data register, MDRIU 270 and MDRIL 271. HIT STACK 266 simply stores the search hit record addresses.

FLD ADDR REG 263 provides the addressing to the COMPARE ARRAYS for the searches which are not all done in sequence (i.e., link field is employed). RD/WR/SEARCH SEQUENCER 265 actually controls the detailed operation of the COMPARE ARRAYS. DELAY REG 264 permits a variable search cycle time as a function of maximum number of bytes per field and number of terms in the Boolean Expressions.

BOOLEAN EVALUATOR MEMORY 261 stores the Boolean Expression in such a form as to be executed (or evaluated) by RD/WR/SEARCH SEQUENCER using the true/false logical compare results as inputs.

Figure 10A:
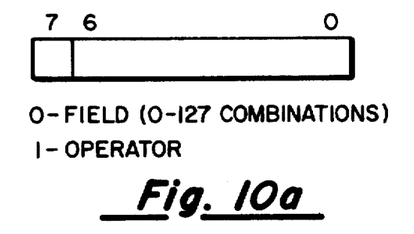
FIG. 10a is the format used for each byte of the Boolean Expression table.

FIG. 10a shows the format for each entry in BOOLEAN EVALUATOR MEMORY 261 as initially prepared by the host. The entry may specify an operator (i.e., Boolean operator) or an input variable (i.e., true or false indication for a specified field of a record). Each entry is eight bits wherein the most significant bit (i.e., $2^7$ or $2^{15}$) is a binary zero to denote a variable or a binary one to denote a Boolean operator. If a variable is indicated, the seven least significant bits of the entry (i.e., $2^0$–$2^6$ or $2^8$–$2^{14}$) simply give the byte position of the most significant byte of the desired field. If a Boolean operator is indicated, the three least significant bits of the byte (i.e., $2^0$–$2^2$ or $2^8$–$2^{10}$) define the Boolean Operator.

Figure 10B:
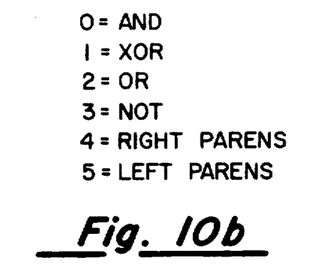
FIG. 10b lists the defined Boolean Operators.
Figure 10C:
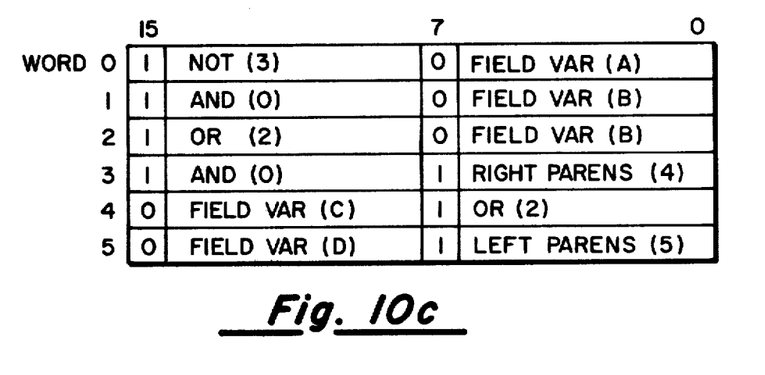
FIG. 10c shows the Boolean Expression table for a sample Boolean Expression.
Figure 10D:
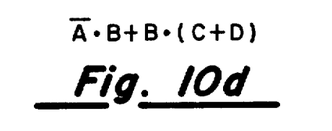
FIG. 10d shows the sample Boolean Expression.

FIG. 10b lists the six codes used to specify the six defined Boolean Operators. If we consider the expression shown in FIG. 10d as an example of a desired search definition, FIG. 10c shows the entry prepared to represent that expression. In this example, A, B, C, and D are the results of the logical comparison (i.e., either true or false) for fields, A, B, C, and D, respectively. A record is a hit (i.e., satisfies the search criteria) if:

(1) Field A of a record when arithmetically compared to field A of the Reference Word does not yield the expected result (i.e., less than, equal to, or greater than specified for field A by FIELD COMPARISON REGISTER 44 and Field B does; or (2) Field B of a record when arithmetically compared against the corresponding field of the Reference Word yields the expected result and either or both of fields C and D also do.

The actual entry stored in BOOLEAN EVALUATOR MEMORY 261 is different in format though it contains the same information as the initially prepared entry. The format change occurs as a result of MPC 240 (See also FIG. 5) parsing the initially prepared entries to produce a more compact and easier to use representation of the expression. The parsing occurs during the loading of BOOLEAN EVALUATOR MEMORY 261 before initiation of a search. Below is included a portion of the listing of the micro program used by MPC 240 to control the search functions. Parsing of the initially prepared entries and loading of BOOLEAN EVALUATOR MEMORY 261 utilizes the logic beginning at logical address LBEX (i.e., numerical address 000543). The entire microprogram listing may be found in the above identified U.S. patent application entitled High Speed Data Base Search System.

```
MICROCODE FOR HIGH SPEED SEARCH FUNCTION (HSSF)                                                    DATE 041580    PAGE   19

986.       .  *                                                                    *
987.       .  *............................................*
988.       .  *............................................*
989.       .  *                                                                    *
990.       .  * UPDATE RECORD. - TO BE ADDED LATER                                  *
991.       .  *                                                                    *
992.       .  *............................................*
993.       .  *............................................*
994.       .  *                                                                    *
995.       .  * LOAD BOOLEAN EXPRESSION-ROUTINE TAKES USES                          *    . (CHAR COUNT MUST
996.       .  * EXPRESS AND MAKES IT PART OF THE SEARCH                             *    . BE EVEN NUMBER)
997.       .  *                                                                    *
998.       .  *............................................*
999.        000543  16 00 212 076 2 10 2   LBEX    LD1    AC.KL,I          CCNT    ,0212           . NOT CLEARED IF
1000.       000544  18 00 211 06 4 3 01 3          L1     AND.AR.ACC,A     CONT    ,BSCNT          . AN ERROR HAPPENS
1001.       000545  18 00 177 0 010 10 2           M1     VECR,KL,I        CONT    ,CRD            . TO LOWER PAGE FOR
1002. T     000546  05 00 031 0 000 00 0           M1     ,,0              JSBR    ,TLP            . COMM RD ROUTINE
1003.                                                                                              . RD FIRST WORD FR
1004.                                                                                              . 502 MEM AS CHAR
1005.                                                                                              . COUNT
1006.       000547  16 00 001 076 2 10 2           LD1    AC.KL,I          CONT    ,01             . SET 1ST CHAR
1007.       000550  16 00 201 06 4 3 01 3          L1     AND.AR.ACC,A     CONT    ,CHFLG          . FLAG
1008.       000551  16 00 121 076 1 35 3           LD1    R.ODATA,A        CONT    ,CCSAV          . SAVE CHAR COUNT
1009.       000552  16 00 121 077 2 00 3           LD1S   AC.RAM,A         CONT    ,CCSAV          . TEST CHAR CNT=0
1010. T     000553  03 03 312 0 000 00 0           M1     ,,0              CBR     ZERO,XX1-1      . IF ZERO SR SET.ERR
1011.       000554  16 00 046 076 2 13 2   OPRND   LD1    AC.KU,I          CCNT    ,046            . ACC=LD FOR OP INST
1012.                                                                                              . BITS 13,12,11
1013.       000555  16 00 206 06 4 3 01 3          L1     AND.AR.ACC,A     CONT    ,INST           . LOAD RAM CELL WITH
1014.       000556  16 00 177 0 010 10 2   OP1     M1     VECR,KL,I        CONT    ,CRD            . COMM RD IN PAGE 0
1015. T     000557  05 00 031 0 000 00 0           M1     ,,0              JSBR    ,TLP            . TO INTERPAGE JP
1016.       000560  16 00 002 076 2 10 2           LD1    AC.KL,I          CONT    ,02             ./
1017.       000561  16 00 121 05 4 2 00 3          AC1    SUA.AC.RAM,A     CCNT    ,CCSAV          . CCSAV-2
1018.       000562  16 00 121 06 4 3 01 3          L1     AND.AR.ACC,A     CONT    ,CCSAV
1019.       000563  16 00 000 076 2 35 2           LD1    AC.ODATA,I       CONT    ,               . LOAD BOTH CHAR BYT
1020.       000564  16 00 377 06 4 2 10 2          L1     AND,AC.KL,I      CPNT    ,0377           . MASK FOR 2ND CHAR
1021.       000565  16 00 301 06 4 3 01 3          L1     AND.AR.ACC,A     CONT    ,CSAV3          . SAVE FOR LATER
1022.       000566  16 00 000 076 2 35 2           LD1    AC.ODATA,I       CONT    ,               . USE LOAD BOTH
1023.                                                                                              . CHAR'S
1024.       000567  16 00 007 0 010 10 2           M1     VECR,KL,I        CONT    ,07             . TO LOAD 2910
1025.       000570  06 01 000 0 003 03 2           M1     LCTR,SFUD3,I     CJD     FALSE,          . COUNTER FOR
1026.                                                                                              . 0 SHIFTS
1027.       000571  16 00 000 160 3 0 2            SR1    UND,I            CONT    ,
1028. T     000572  11 00 171 0 000 00 0           M1     ,,0              RPBA    ,$-1            . SHIFT AGAIN UNTIL
1029.                                                                                              . COUNTER=0
1030.       000573  16 00 377 06 4 2 10 2          L1     AND.AC.KL,I      CONT    ,0377           . MASK
1031.       000574  16 00 117 06 4 3 01 3          L1     AND.AR.ACC,A     CPNT    ,CSAV1          . SAVE MASKED NO
1032.       000575  16 00 201 077 2 00 3           LD1S   AC.RAM,A         CONT    ,CHFLG          . TST 1ST CHAR
1033. T     000576  03 03 205 0 000 00 0           M1     ,,0              CBR     ZERO,FDCH       . IF NOT 1ST CHAR
1034.       000577  16 00 117 076 2 00 3           LD1    AC.RAM,A         CONT    ,CSAV1          . EXAMINE OTHER
1035.                                                                                              . CHARACTERS
1036.       000600  16 00 177 05 5 2 10 2          AC1    SBAS,AC,KL,I     CONT    ,0177           . YES CONTINUE
1037.       000601  16 00 201 04 0 3 00 3          A1     ZR,AR,RAM,A      CONT    ,CHFLG          . ZERO FLAG
1038. T     000602  03 04 245 0 000 00 0           M1     ,,0              CBR     NEG,NOTF        . SOUR-ACC-+VE CHAR
1039. T     000603  03 05 253 0 000 00 0           M1     ,,0              CBR     POS,FTCH
1040. T     000604  03 00 312 0 000 00 0           M1     ,,0              CBR     TRUE,XX1-1      . ERROR
1041.       000605  16 00 001 0 010 10 2   FDCH    M1     VECR,KL,I        CONT    ,01
1042.       000606  06 01 000 0 003 03 2           M1     LCTR,SFUD3,I     CJD     FALSE,          . CTR = 01
1043.       000607  16 00 117 076 2 00 3   FDCH1   LD1    AC.RAM,A         CONT    ,CSAV1
1044.       000610  16 00 302 06 4 3 01 3   FDCH2   L1     AND.AR.ACC,A     CONT    ,CSAV4
1045.       000611  16 00 177 05 5 2 10 2          AC1    SBAS,AC,KL,I     CONT    ,0177           . SOUR-ACC=+VE FOR
1046.                                                                                              . CHAR
1047. T     000612  03 04 222 0 000 00 0           M1     ,,0              CBR     NEG,NOT         . MAYBE NOT
1048. T     000613  11 00 217 0 000 00 0           M1     ,,0              RPBA    ,$+4            . TREAT CHAR
1049.       000614  16 00 301 076 2 00 3           LD1    AC.RAM,A         CONT    ,CSAV3          . CHAR IN UPPER BYTE
1050.       000615  16 00 300 06 4 3 01 3          L1     AND.AR.ACC,A     CONT    ,CSAV0          . READ
1051. T     000616  03 00 276 0 000 00 0           M1     ,,0              CBR     TRUE,OPER       . FORM THE BEM INST
1052.       000617  16 00 117 076 2 00 3           LD1    AC.RAM,A         CONT    ,CSAV1          . FORM BEM INST
1053.       000620  16 00 300 06 4 3 01 3          L1     AND.AR.ACC,A     CONT    ,CSAV0          . FOR 2ND CHAR
1054. T     000621  03 00 276 0 000 00 0           M1     ,,0              CBR     TRUE,OPER
1055.       000622  16 00 302 076 2 00 3   NOT     LD1    AC.RAM,A         CONT    ,CSAV4          . TEST 502 WORD FOR
1056.                                                                                              . NOT
1057.       000623  16 00 203 05 5 2 10 2          AC1    SBAS,AC,KL,1     CONT    ,0203           . IF = 0 THEN NOT
1058.
1059. T     000624  03 02 240 0 000 00 0           M1     ,,0              CBR     NZ,REPT
1060. T     000625  11 00 233 0 000 00 0           M1     ,,0              RPBA    ,$+6            . 1ST OR 2ND WORD
1061.       000626  18 00 301 076 2 00 3           LD1    AC.RAM,A         CONT    ,CSAV3
1062.       000627  16 00 300 06 4 3 01 3          L1     AND.AR.ACC,A     CONT    ,CSAV0
1063.       000630  18 00 044 076 2 13 2           LD1    AC.KU,I          CONT    ,044            . NOT FLAG TO INST
1064.       000631  18 00 206 06 4 3 01 3          L1     AND.AR.ACC,A     CONT    ,INST           . TO OPER
1065. T     000632  03 00 156 0 000 00 0           M1     ,,0              CBR     TRUE,OP1
1066.       000633  16 00 301 076 2 00 3           LD1    AC.RAM,A         CONT    ,CSAV3
1067.       000634  16 00 300 06 4 3 01 3          L1     AND.AR.ACC,A     CONT    ,CSAV0
1068.       000635  16 00 044 076 2 13 2           LD1    AC.KU,I          CONT    ,044            . NOT FLAG TO INST
1069.       000636  16 00 074 076 2 13 2           L1     AND.AR.ACC,A     CONT    ,INST           . MODIFY BEM INST
1070. T     000637  03 00 276 0 000 00 0           M1     ,,0              CBR     TRUE,OPER       . TO MOD WITH OPERA
1071.                                                                                              . AND STORE
1072.       000640  16 00 117 076 2 00 3   REPT    LD1    AC.RAM,A         CONT    ,CSAV1          . PREP TO 2ND PASS
1073.       000641  16 00 120 06 4 3 01 3          L1     AND.AR.ACC,A     CONT    ,CSAV2          ./
1074.       000642  16 00 301 076 2 00 3           LD1    AC.RAM,A         CONT    ,CSAV3
1075. T     000643  11 00 210 0 000 00 0           M1     ,,0              RPDA    ,FDCH2          . REPEAT FOR 2ND WORD
1076. T     000644  03 00 312 0 000 00 0           M1     ,,0              CBR     TRUE,XX1-1      . REPORT BAD EI
1077.       000645  16 00 117 076 2 00 3   NOTF    LD1    AC.RAM,A         CONT    ,CSAV1
1078.       000646  16 00 203 05 5 2 10 2          AC1    SBAS,AC,KL,I     CONT    ,0203           . NOT = 0203
1079. T     000647  03 02 312 0 000 00 0           M1     ,,0              CBR     NZ,XX1-1        . REPORT BAD EI
1080.       000650  16 00 074 076 2 13 2   NOTO    LD1    AC.KU,I          CONT    ,074            . LOAD FLAG NOT
1081.       000651  16 00 301 04 6 2 00 3          A1     ADD,AC.RAM,A     CONT    ,CSAV3
1082. T     000652  03 00 255 0 000 00 0           M1     ,,0              CBR     TRUE,FTCH1
```

```
1083.        000653  16 00 076 076 2 13 2   FTCH    LD1    AC,KU,I          CONT    ,076        . OPERAND DETECTED
1084.        000654  16 00 117 04 6 2 00 3          A1     ADD,AC,RAM,A     CONT    ,CSAV1      . ADD FLAG ADDR
1085.        000655  16 00 206 06 4 3 01 3  FTCH1   L1     AND,AR,ACC,A     CONT    ,INST       . FORM INST
1086.        000656  16 00 301 076 2 00 3           LD1    AC,RAM,A         CONT    ,CSAV3      . OPERATION TO CSAV2
1087.        000657  16 00 120 06 4 3 01 3          L1     AND,AR,ACC,A     CUNT    ,CSAV2      . FOR OP DECODE
1088.        000660  16 00 121 077 2 00 3   OPND1   LD1S   AC,RAM,A         CONT    ,CCSAV      . ACC=CHAR COUNT
1089. T      000661  03 03 271 0 000 00 0           M1     ..0              CBR     ZERO,ENDI   . IF CHAR COUNT = 0
1090.                                                                                           . ALL CHAR XFR'D
1091.                                                                                           . TO HSSF,SET END
1092.                                                                                           . FLAG IN BEM INSTRU
1093.        000662  16 00 211 076 2 00 3           LD1    AC,RAM,A         CONT    ,BSCNT      . CC NOT 0,LOAD
1094.                                                                                           . INST FOR BEM SIMU
1095.                                                                                           . RAM CELLS
1096.        000663  16 00 000 0 002 01 2           M1     INDR,ACC,I       CONT    ,           . FIRST LOAD INDEX
1097.                                                                                           . REGISTER RAM ADDR
1098.        000664  16 00 001 04 6 2 10 2          A1     ADD,AC,XL,I      CUNT    ,01         . TO SAVE BEM INST
1099.                                                                                           . PRIOR TO XFR TO
1100.        000665  16 00 211 06 4 3 01 3          L1     AND,AR,ACC,A     CONT    ,BSCNT      . BEM,INC ADDR BY
1101.        000666  16 00 206 076 2 00 3           LD1    AC,RAM,A         CONT    ,INST       . FABRICATED INSTRUC
1102.                                                                                           . TO ACC
1103. T      000667  03 03 326 06 4 3 01 2          L1     AND,AR,ACC,I     CBR     ZERO,XFRAM  . XFER TO BEM
1104. T      000670  03 00 154 0 000 00 2           M1     ..I              CBR     TRUE,OPRND  . BEM INST TO TEMP
1105.                                                                                           . RAM, GO TO
1106.                                                                                           . OPERATOR ROUTINE
1107.        000671  16 00 206 076 2 00 3   ENDI    LD1    AC,RAM,A         CONT    ,INST       . HANDLE THE LAST
1108.                                                                                           . BEM INSTRUC PRIOR
1109.                                                                                           . TO XFR TO BEM FOR
1110.                                                                                           . EVALUATION
1111.        000672  16 00 100 04 6 2 13 2          A1     ADD,AC,KU,I      CONT    ,0100       . SET BIT 14 IN INSTR
1112.        000673  16 00 206 06 4 3 01 3          L1     AND,AR,ACC,A     CONT    ,INST
1113.                                                                                           . AS LAST BEM INSTR
1114.        000674  16 00 023 0 027 00 3          M1     EICAP,RAM,A       CONT    ,GDEI3-     . GOOD EI OF 4 TO CM
1115. T      000675  03 03 262 0 000 00 0          M1     ..0               CBR     TRUE,OPND1+2 . ALL CHARS INTO
1116.                                                                                           . HSSF GO TO XFR
1117.                                                                                           . BEM INSTR TO BEM
1118.        000676  16 00 206 076 2 00 3   OPER    LD1    AC,RAM,A         CONT    ,INST       . OPERATOR ROUTINE
1119.                                                                                           . TEST CC=0,SET SR
1120.        000677  16 00 300 04 6 2 00 3          A1     ADD,AC,RAM,A     CONT    ,CSAV0      . IF ZERO TO ERROR
1121.                                                                                           . ROUTINE
1122.        000700  16 00 206 06 4 3 01 3          L1     AND,AR,ACC,A     CONT    ,INST       . ZERO INST CELL
1123.        000701  16 00 120 076 2 00 3           LD1    AC,RAM,A         CONT    ,CSAV2      . LOAD ACC WITH 2ND
1124.                                                                                           . CHAR FOR OPERATOR
1125.                                                                                           . TEST
1126.        000702  16 00 200 05 5 2 10 2          AC1    SBAS,AC,KL,I     CONT    ,0200       . TEST FOR AND OPTR
1127. T      000703  03 03 315 0 000 00 0           M1     ..0              CBR     ZERO,ANDI   . IF ZERO,AND TO
1128.                                                                                           . BEM INSTRUC
1129.        000704  16 00 120 076 2 00 3           LD1    AC,RAM,A         CONT    ,CSAV2      . LOAD OPTR FOR TEST
1130.        000705  16 00 201 05 5 2 10 2          AC1    SBAS,AC,KL,I     CONT    ,0201       . TEST FOR XOR OPTR
1131.                                                                                           . SET SR
1132. T      000706  03 03 323 0 000 00 0           M1     ..0              CBR     ZERO,XORI   . IF ZERO,XOR TO
1133.                                                                                           . BEM INSTRU
1134.        000707  16 00 120 076 2 00 3           LD1    AC,RAM,A         CONT    ,CSAV2      . LOAD OPTR FOR TEST
1135.        000710  16 00 202 05 5 2 10 2          AC1    SBAS,AC,KL,I     CONT    ,0202       . TEST FOR OR OPTR
1136. T      000711  03 03 320 0 000 00 0           M1     ..0              CBR     ZERO,REST2  . IF ZERO, OR TO
1137.                                                                                           . BEM INSTRUC
1138.                                                                                           . FAIL, ERROR,RESET
1139.                                                                                           . OD ACTIVE, REPORT
1140.                                                                                           . ERROR
1141.        000712  16 00 037 0 027 00 3           M1     EICAP,RAM,A      CONT    ,BAD7       . EICAP HAS BED EI
1142.        000713  16 00 005 0 010 10 2   XX1     M1     VECR,KL,I        CONT    ,OTERM
1143.                                                                                           . CODE
1144.        000714  06 00 000 0 000 00 0           M1     ..0              CJD     TRUE,       . EIDATA(PAGE 1)
1145.        000715  16 00 020 076 2 13 2   ANDI    LD1    AC,KU,I          CONT    ,020        . SET BIT 12 OF OP
1146.                                                                                           . CODE FOR AND
1147.                                                                                           . OPERATION IN BEM
1148.        000716  16 00 206 04 6 2 00 3          A1     ADD,AC,RAM,A     CONT    ,INST       . INSTRU
1149.        000717  16 00 206 06 4 3 01 3  RESTI   L1     AND,AR,ACC,A     CONT    ,INST       . RESTORE IN RAM FOR
1150.                                                                                           . OTHER CHANGES
1151.        000720  16 00 301 076 2 00 3   REST2   LD1    AC,RAM,A         CONT    ,CSAV3
1152.        000721  16 00 120 06 4 3 01 3          L1     AND,AR,ACC,A     CONT    ,CSAV2
1153. T      000722  03 00 260 0 000 00 0           M1     ..0              CBR     TRUE,OPND1  . TO OPERAND FOR NEXT
1154.                                                                                           . WORD FROM S02 MEM
1155.        000723  16 00 010 076 2 13 2   XORI    LD1    AC,KU,I          CONT    ,010        . SET BIT 11 OF OP
1156.        000724  16 00 206 04 6 2 00 3          A1     ADD,AC,RAM,A     CONT    ,INST       . CODE FOR XOR OPER
1157.                                                                                           . IN BEM INSTRUC
1158. T      000725  03 00 317 0 000 00 0           M1     ..0              CBR     TRUE,RESTI  . RESTORE NEW INST
1159.                                                                                           . INST
1160.        000726  16 00 000 0 012 10 2   XFRAM   M1     ZBMA,KL,I        CONT    ,0          . XFR INSTRUCTIONS
1161.                                                                                           . TO BEM ZERO BEM
1162.        000727  16 00 212 0 002 10 2           M1     INDR,KL,I        CONT    ,0212       . LOAD RAM ADDR
1163.        000730  16 00 037 076 2 10 2           LD1    AC,KL,I          CONT    ,037        . INDEX REG TO BEG
1164.        000731  16 00 000 0 011 00 1           M1     BEM,RAM,II       CONT    ,           . LOAD RAM TO BEM
1165.        000732  16 00 001 05 5 2 10 2          AC1    SBSS,AC,KL,I     CONT    ,01         . XFERRED SET SR
1166. T      000733  03 03 313 0 000 00 2           M1     ..I              CBR     ZERO,XX1    . FIN TO OTERM
1167. T      000734  03 00 331 0 000 00 2           M1     ..I              CBR     TRUE,XF1    . STORE NEXT WORD
1168.                                       . ...................................................
1169.                                       .                                                    .
1170.                                       . . COMMON FUNCTION ERROR ROUTINE                    .
1171.                                       .                                                    .
1172.                                       . ...................................................
1173.        000735  16 00 044 0 027 00 3   ERRO    M1     EICAP,RAM,A      CONT    ,ERRO       . REPORT ERROR TYPE
1174. T      000736  03 00 102 0 000 00 0           M1     ..0              CBR     TRUE,EIDAT
1175.                                       . ...................................................
1176.                                       .                                                    .
1177.                                       . * PREP THE RAM WITH CONTANTS NEEDED AS IOI*
1178.                                       . * INTERRUPT VECTOR ADDRESS, THIS OCCURS AT*
1179.                                       .            INITIALIZATION                *
1180.                                       .                                                    .
1181.                                       . ...................................................
1182.        000737  16 00 377 0 010 10 2   PREP    M1     VECR,KL,I        CONT    ,0377       . SETUP COUNTER
1183.        000740  06 01 000 0 003 00 2           M1     LCTR,,I          CJD     FALSE,      . TO ZERO
1184. T      000741  11 00 341 04 0 1 01 1  PREP1   A1     ZR,R,ACC,II      RPBA    ,PREP1      . ALL LOCATIONS
1185.        000742  16 00 006 0 002 10 2           M1     INDR,KL,I        CONT    ,06         . LOAD INDEX WITH 6
1186.        000743  16 00 030 076 2 13 2           LD1    AC,KU,I          CONT    ,030
1187.        000744  16 00 001 04 6 1 10 1          A1     ADD,R,KL,II      CONT    ,01         ./ 014001=6
1188.        000745  16 00 232 076 2 13 2           LD1    AC,KU,I          CONT    ,0232
1189.        000746  16 00 001 04 6 1 10 1          A1     ADD,R,KL,II      CONT    ,01         . 115001=7
1190.        000747  16 00 233 076 2 13 2           LD1    AC,KU,I          CONT    ,0233
1191.        000750  16 00 001 04 6 1 10 1          A1     ADD,R,KL,II      CONT    ,01         . 115401=10
1192.        000751  16 00 002 0 010 10 2           M1     VECR,KL,I        CONT    ,02         . SETUP COUNTER TO
1193.        000752  06 01 000 0 003 00 2           M1     LCTR,,I          CJD     FALSE,      . WRITE NEXT 4 LOC
1194.        000753  16 00 001 076 2 13 2           LD1    AC,KU,I          CONT    ,01
1195.        000754  16 00 004 04 6 3 10 1          A1     ADD,AR,KL,II     CONT    ,04         . 000404=11
1196.        000755  16 00 002 04 6 3 10 1  PREP2   A1     ADD,AR,KL,I      CONT    ,02         . 000406=12
1197. T      000756  11 00 355 0 000 00 1           M1     ..II             RPBA    ,PREP2      . 000410=13
1198.                                                                                           . 000412=14
1199.        000757  16 00 002 076 2 13 2           LD1    AC,KU,I          CONT    ,02
1200.        000760  16 00 040 04 6 3 10 1          A1     ADD,AR,KL,II     CONT    ,040        . 001040=15
1201.        000761  16 00 200 04 6 3 10 1          A1     ADD,AR,KL,II     CONT    ,0200       . 001240=16
```

| | | | | | | | | | |
|---|---|---|---|---|---|---|---|---|---|
| 1202. | 000762 | 16 00 006 0 010 10 1 | | M1 | VECR,KL,II | CONT | ,06 | . SKIP LOC 17 AND SET | |
| 1203. | | | | | | | | . UP CNTR FOR NEXT 8 | |
| 1204. | 000763 | 16 00 001 076 3 10 1 | | LO1 | AR,KL,II | CONT | ,01 | . 000001=21 GOOD EI | |
| 1205. | 000764 | 06 01 000 0 003 00 2 | | M1 | LCTR,,I | CJD | FALSE, | . LOCATIONS | |
| 1206. | 000765 | 16 00 001 04 6 3 10 2 | PREP3 | A1 | ADD,AR,KL,I | CONT | ,01 | . 000002=21 | |
| 1207. T | 000766 | 11 00 365 0 000 00 1 | | M1 | ,,II | RPBA | ,PREP3 | | |
| 1208. | | | | | | | | . 000010=27 | |
| 1209. | 000767 | 16 00 017 0 010 10 2 | | M1 | VECR,KL,I | CONT | ,017 | . SETUP COUNTER | |
| 1210. | 000770 | 06 01 000 0 003 00 2 | | M1 | LCTR,,I | CJD | FALSE, | . TO WRITE NEXT 16 LO | |
| 1211. | 000771 | 16 00 200 076 2 13 2 | | LD1 | AC,KU,I | CONT | ,0200 | . SET UPPER BIT INDIC | |
| 1212. | | | | | | | | . ATE BAD EI'S | |
| 1213. | 000772 | 16 00 001 04 6 3 10 2 | PREP4 | A1 | ADD,AR,KL,1 | CONT | ,01 | . 100001=30 | |

Figure 11:
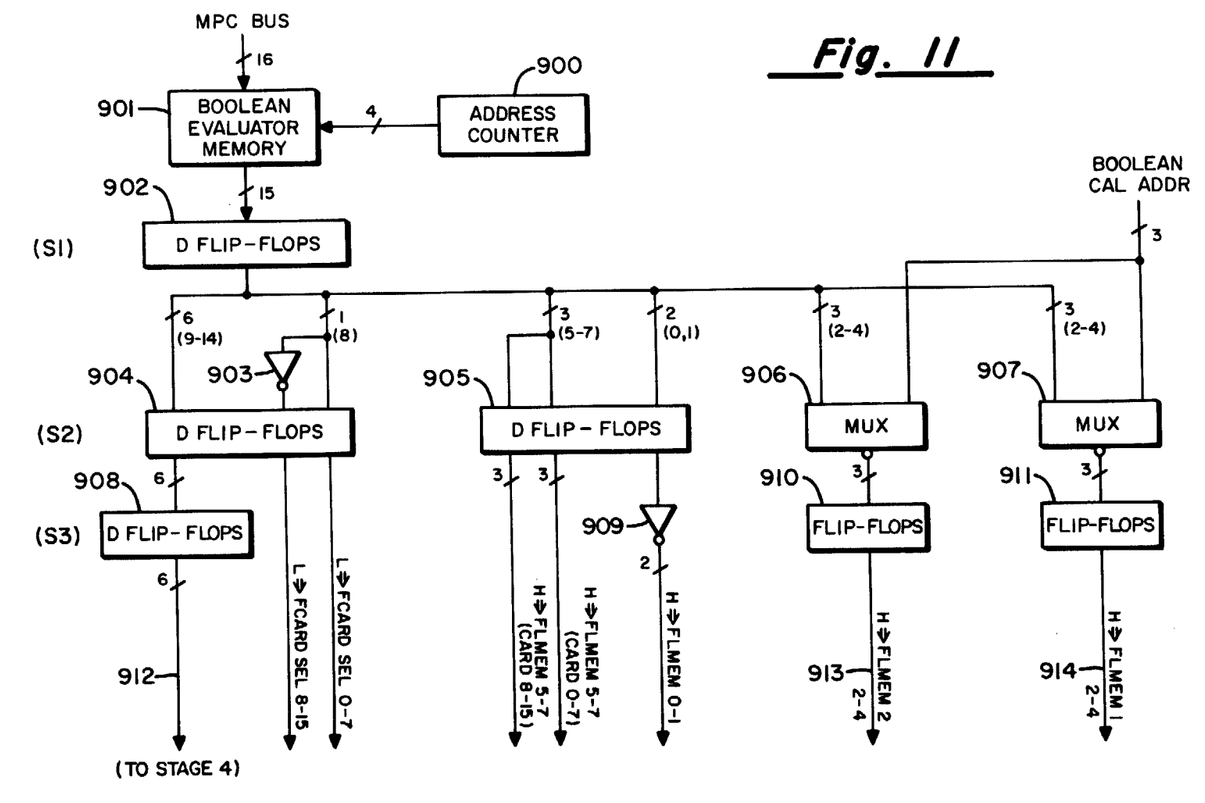
FIG. 11 shows the detailed circuitry for the first two stages of the Boolean Evaluator.
Figure 12:
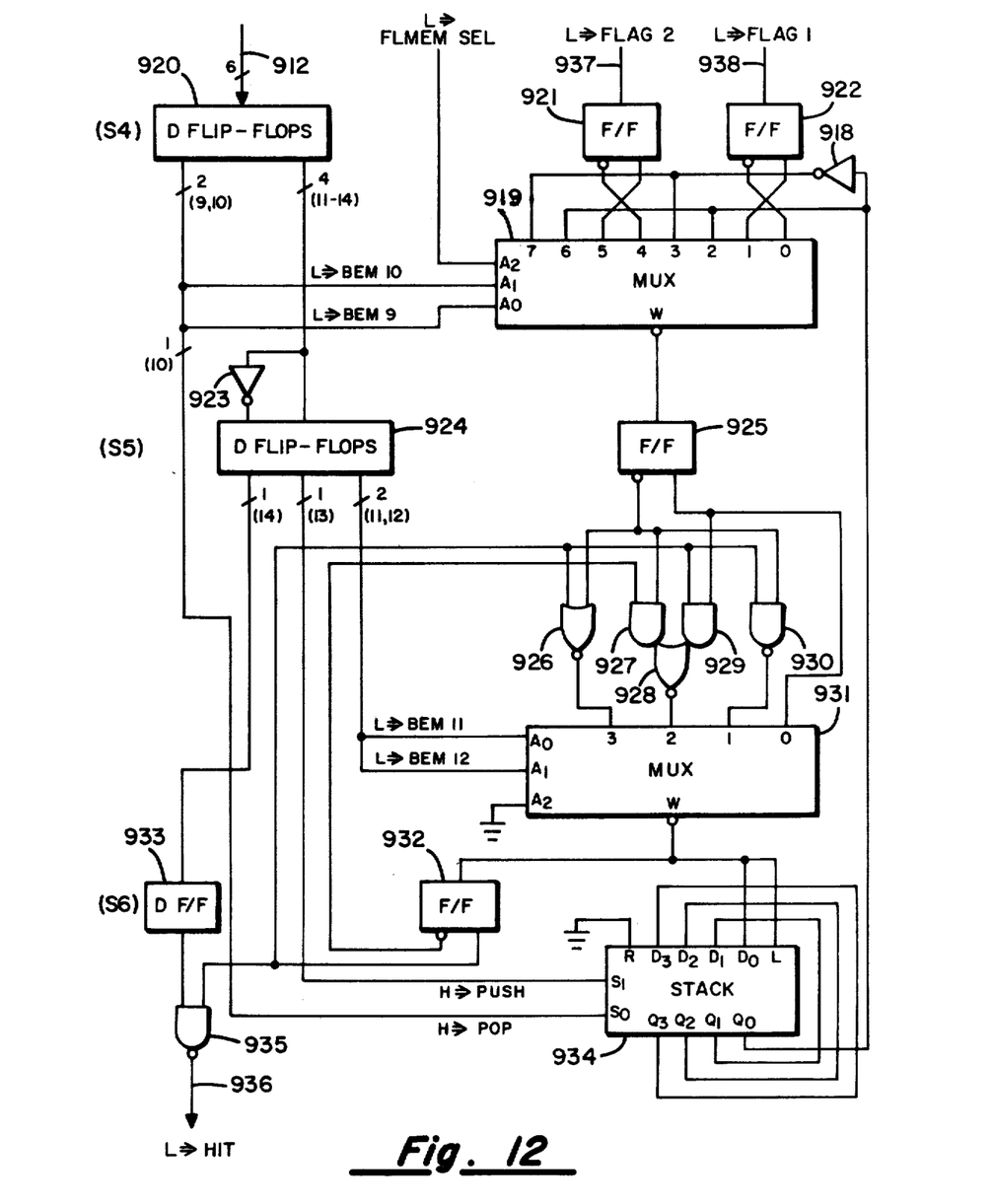
FIG. 12 shows the detailed circuitry for the last two stages of the Boolean Evaluator.
Figure 13:
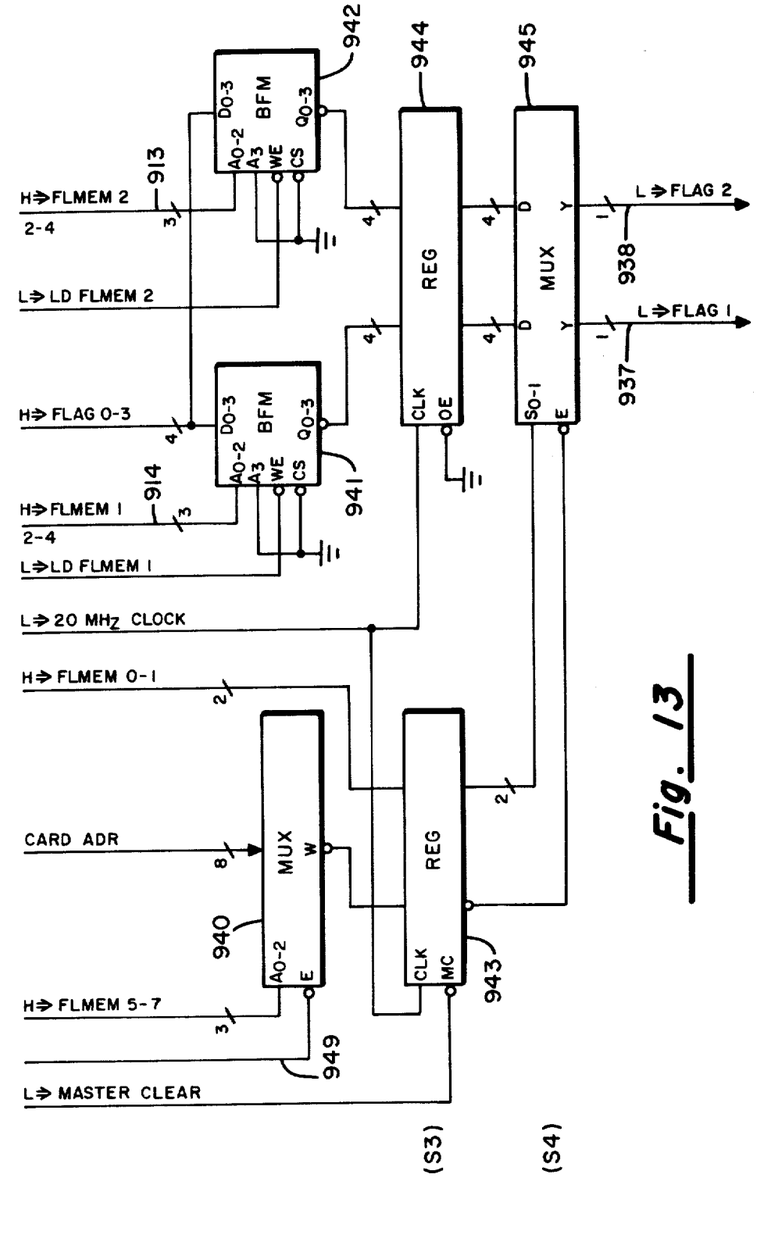
FIG. 13 shows the detailed circuitry for stages three and four of the Boolean Evaluator.
Figure 14:
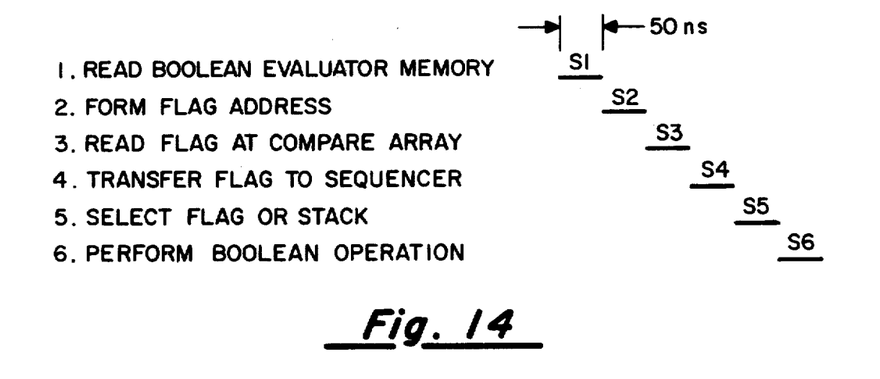
FIG. 14 shows the pipelined timing of the Boolean Evaluator.
Figure 15:
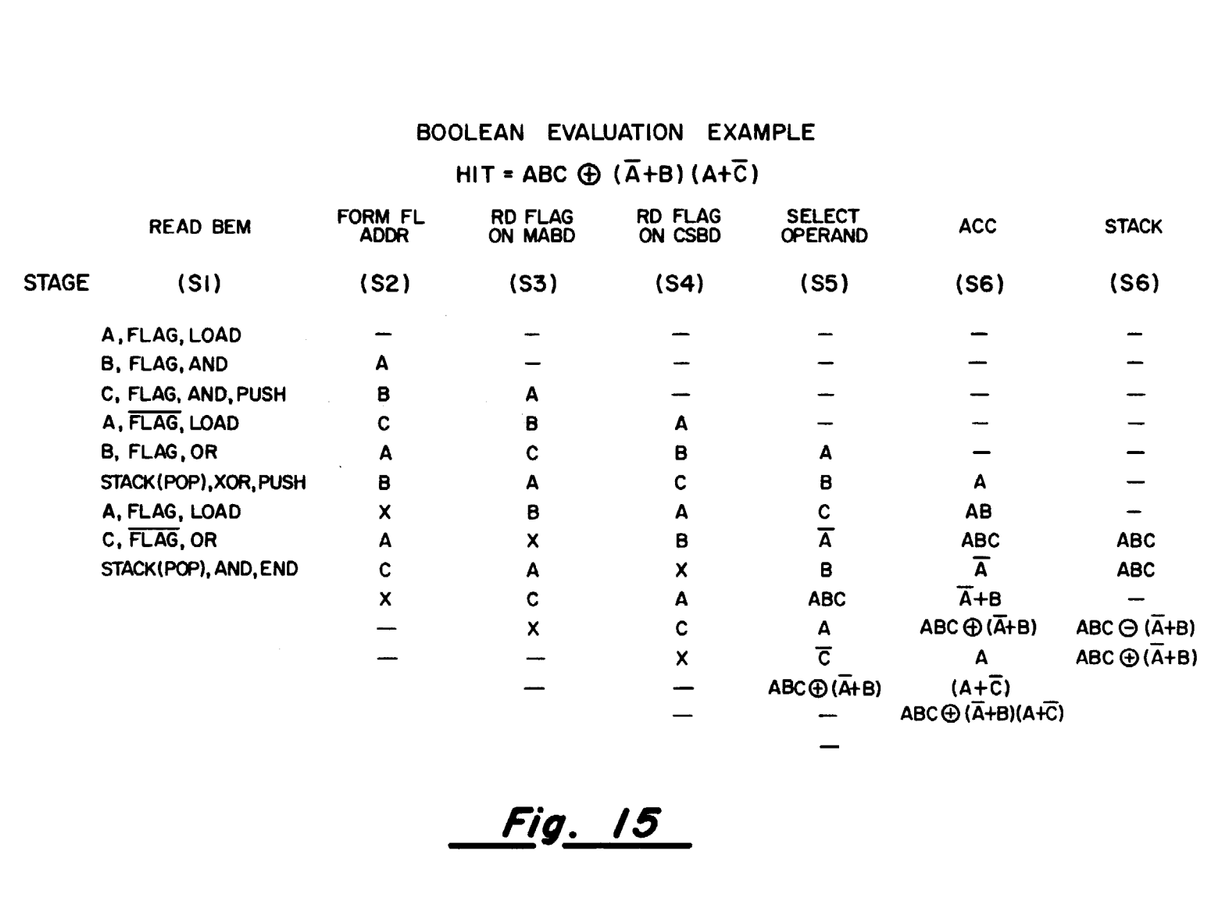
FIG. 15 shows execution of a sample Boolean Expression.

FIGS. 11, 12 and 13 show the detailed construction of the Boolean Evaluator. FIG. 14 shows the overall Boolean Evaluator timing, and FIG. 15 shows a timing example.

Referring to FIG. 11, BOOLEAN EVALUATOR MEMORY 901 is loaded with the parsed entries from MPC BUS 103 before search initiation. The loading is accomplished using 16 bit words as shown. Actually only 15 bit words are required as is evident below. BOOLEAN EVALUATOR MEMORY 901 is addressed via ADDRESS COUNTER 900 which simply sequences through the addressable locations of BOOLEAN EVALUATOR MEMORY 901 to sequentially access the definitions of the Boolean operators and variables as required. The 15 bit output of BOOLEAN EVALUATOR MEMORY 901 is stored in D FLIP-FLOPS 902 at sequence S1. The 15 bit output of D FLIP-FLOPS 902 is divided as shown for transfer to D FLIP-FLOPS 904, D FLIP-FLOPS 905, MUX 906 and MUX 907. The two least significant bit positions (i.e., bits 0 and 1) are transferred to D FLIP-FLOPS 905. Bit positions 2, 3, and 4 are transferred to both MUX 906 and MUX 907. D FLIP-FLOPS 905 receives bit positions 5,6, and 7. The remaining bit positions (i.e., 8-14) are transferred to D FLIP-FLOPS 904. As can be seen, the lower order bit positions (i.e., 0-7) specify variables in that these bit positions represent addressing information used to address FLAG MEMORY 321 of the COMPARE ARRAYS. See FIG. 6. Notice that the addressing information is received through physical cables 101e, f, and g (i.e., portions of HSSF 101). These physical cables correspond to the functional cables 913 and 914 of FIG. 11.

MUX 906 and MUX 907 normally select the output of D FlIP-FLOPS 902 for transfer to FLIP-FLOPS 910 and 911, respectively. During loading, however, the three bit BOOLEAN CAL (i.e., calibrate) ADDR (i.e., address) signal is selected. The three bit outputs of MUX 906 and 907 are stored by FLIP-FLOPS 910 and 911. Cables 913 and 914 are used to address the Boolean Flag Memories (i.e., BFM 941 and BFM 942) in the COMPARE ARRAY'S as shown in FIG. 13.

Referring again to FIG. 11, D FLIP-FLOPS 905 receives bit positions 0, 1, 5, 6, and 7 from D FLIP-FLOPS 902. Bit positions 0 and 1 are inverted by inverter 909 and supplied as signals H→FLMEM 0-1 to REG 943 as shown on FIG. 13. The corresponding two bit output is the selection input to MUX 945. As is discussed below, this is the byte selection from the flag memories (i.e., BFM 941 and 942). As can be seen in FIG. 11, bit positions 5, 6, and 7 are output from D FLIP-FLOPS 905 as three bit signals designated H→FLEM 5-7 (Card 0-7) and H→FLEM 5-7 (CARD 9-15). These are equivalent signals as shown. By referring to FIG. 13, it can be seen that signal H→FLMEM 5-7 is used as the three bit selection input to MUX 940. As explained further below, MUX 940 selects one of the eight CARD ADR inputs corresponding to bit positions 5, 6 and 7 of the flag memories.

As explained above, the most significant bit positions (i.e., bit positions 8-14) of BOOLEAN EVALUATOR MEMORY 901 and hence D FLIP-FLOPS 902 are the control signals used to specify the Boolean operators. Referring again to FIG. 11, it is seen that bit positions 8-14 are stored within D FLIP-FLOPS 904. Notice that bit position 8 is also inverted by inverter 903 and stored in the inverse. Bit position 8 is output in both true and complement form as signals L→F CARD SEL 0-7 and L→F CARD SEL 8-15. These signals select either the eight lower order or eight higher order COMPARE ARRAY's (i.e., cards since each COMPARE ARRAY is a single printed circuit card and differs from other COMPARE ARRAY's only by the card position). The remaining six bit positions perform the major control functions in evaluating the Boolean Expression. These six bit positions are stored in D FLIP-FLOPS 908 at stage S3.

Referring to FIG. 12 it can be seen that these six bit positions are transferred to D FLIP-FLOPS 920 via cable 912. Notice that bit positions 11-14 are again stored during stage S5 in D FLIP-FLOPS 924. Bit position 14 is inverted by inverter 923 before storing at stage S5. The inverted bit position 14 is stored in D FLIP-FLOPS 933 at stage 6. The storing of these control signals in successive stages permits the six stage pipelining as discussed below. Bit positions 9 and 10 serve as two of the three selector inputs to MUX 919. The third selector input, called signal L→FLMEM SEL, determines whether MUX 919 will select the FLAG 1 or FLAG 2 input. The signals L→FLAG 2 and L→FLAG 1 are received via lines 937 and 938 from MUX 945 (See also FIG. 13). These are essentially the Boolean Variables as read from BFM 941 and BFM 942. Referring again to FIG. 12, it can be seen that FLAG 1 and FLAG 2 are stored in FLIP-FLOPS 922 and FLIP-FLOPS 921, respectively. The remaining inputs to MUX 919 (i.e., data inputs 2, 3, 6, and 7) are from STACK 934. STACK 934 is a push-down/pop-up stack which is used to provide the capability for using parenthesis in a given Boolean Expression. Inputs 2 and 6 of MUX 919 are the true outputs from STACK 934 whereas inputs 3 and 7 are inverted by inverter 918.

MUX 919 selects one output from the true or complement of FLAG 1, FLAG 2, or STACK 934. Therefore, selector input A0 (i.e., Bit position 9) permits selection of the true or complement of a term. Input A1 (i.e., Bit position 10) permits selection of a flag or STACK 934. Input A2 (i.e., signal FLMEM SEL) permits selection of either FLAG 1 or FLAG 2 if a FLAG input is desired.

FLIP-FLOP 925 stores the selected output of MUX 919 during stage S5. Bit positions 11 and 12 are used during stage S5 as selector inputs to MUX 931. To be selected are the outputs of gate 926, gate 928, gate 930, or F/F 925. The output of gate 926 is the selected flag of STACK 934 (i.e., output of FLIP-FLOP 925) ORed with the true output of FLIP-FLOPS 932 which is derived from the previous output of MUX 931. This function corresponds to the ORing of terms in an expression. Similarly, the output of gate 930 is simply the ANDing of terms in an expression. The output of gate 928 is similarly the Exclusive -OR. The direct output of F/F 925 is called a load. Therefore, MUX 931 selects from OR, AND, Exclusive -OR or Load of terms based upon selection by bit positions 11 and 12.

D FLIP-FLOP 933 stores the complement of bit position 14. Notice that the output of D FLIP-FLOP 933 is ANDed by gate 935 with the output of FLIP-FLOP 932. This permits bit position 14 to enable output (i.e., hit or miss) at the end of an expression. FLIP-FLOP 932 is also called the accumulator (or ACC) since it stores the current value of the expression at stage S6. FLIP-FLOPS 932 is loaded from the output of MUX 931. The output of MUX 931 is also used to load STACK 934. Notice that bit position 13 is used to push the stack down. Bit position 10 is used to pop the stack up. Because STACK 934 is only read on a pop (i.e., end paren in Boolean Expression), bit position 10 is also used as the selector input to MUX 919 for selecting the output of STACK 934.

Referring to FIG. 13, the selection of Boolean Variables (i.e., flags) can be seen. The selection of the flags occurs during stages S3 and S4. As explained above, BFM 941 and 942 are physically located on the printed circuit cards as part of the COMPARE ARRAY'S. BFM 941 and 942 correspond to FLAG MEMORY 321 (See also FIG. 6). As seen in FIG. 6, BFM 941 and 942 are loaded with the flags from four bytes via cable 335. The signals H→FLAG 0-3 are designated on FIG. 13. The write enables (i.e., input WE) to BFM 941 and 942 are designated signals L→LD FLMEM 1 and L→LD FLMEM 2, respectively. Addressing of BFM 941 and 942 is via cables 914 and 913 as explained above.

REG 944 stores the four bit outputs of BFM 941 and 942 during stage S3. During stage S4, MUX 945 selects FLAG 1 and FLAG 2 and transfers these via lines 937 and 938 for evaluation as explained above. REG 944 is constantly enabled for output (i.e., input OE is grounded) and clocked via the 20 MHz CLOCK signal.

Selection by MUX 945 is based upon signals H→FLMEM 0-1 as stored during stage S3 in REG 943. As explained above, signals H→FLMEM 0-1 are simply bit positions 0 and 1 inverted by inverter 909 (see also FIG. 11).

Referring again to FIG. 13, it can be seen that MUX 945 is enabled by one output of REG 943. MUX 940 selects one of eight card addresses based upon signal H→FLMEM 5-7 as explained above. MUX 940 is enabled for output whenever a low is present on line 949. This is a control signal used during translation of CARD ADR.

FIG. 14 shows the overall timing of the Boolean Evaluator which employs a six stage pipeline. Each stage requires approximately 50 nanoseconds as shown. The operation performed during each stage is shown. The reader may want to again consult FIGS. 11, 12 and 13 to review the circuitry which performs the desired function at each stage. As a convenience, the stages are noted.

FIG. 15 shows an example of Boolean Evaluation using the expressions:

$$ABC \oplus (\bar{A}+B)(A+\bar{C})$$

The parsed Boolean operators and variable descriptions are read from BOOLEAN EVALUATOR MEMORY (i.e., BEM) 901 at stage S1. As explained above, the variables A, B and C are flags which are addressed using BEM bit positions 0-7. Bit position 10 specified FLAG or STACK (and POP). Bit position 13 determines PUSH. Bit position 9 determines true or complement. Bit positions 11 and 12 specify function (i.e., AND, OR, XOR or Load). Bit position 14 signifies END of the expression.

Though the preferred embodiment of the present invention is incorporated into the High Speed Search Function product, those skilled in the art will readily see the application of the present invention to systems having significantly different architectures.

What is claimed is:

1. A method of conducting a search of a data base having a plurality of records comprising:
   arithmetically comparing a plurality of fields of a record within said data base to a like plurality of corresponding fields of a reference word in order to derive a like plurality of arithmetic comparison first results;
   logically comparing said plurality of arithmetic comparison first results of said arithmetically comparing to a like plurality of user supplied expected results for said arithmetically comparing of said like plurality of fields of said record in order to derive a like plurality of logical comparison second results;
   determining whether said plurality of logical comparison second results of said logically comparing when used as a plurality of inputs to a user supplied Boolean expression do satisfy said user supplied Boolean expression;
   indicating as a Boolean expression hit upon said record whenever said user supplied Boolean expression is satisfied upon said determining and indicating as a Boolean expression miss upon said record whenever said Boolean expression is not satisfied upon said determining; and
   repeating said arithmetically comparing, said logically comparing, and said indicating for said plurality of records within said data base;
   whereby said Boolean expression hit indicates that a logical relationship amongst and between said like plurality of logical comparison second results has been satisfied;
   whereby since said plurality of logical comparison second results were generated in respect of said plurality of arithmetic comparison first results, said Boolean expression hit means that a logical relationship amongst and between individual arithmetic comparisons of each of said plurality of fields of a record has been satisfied.

2. An apparatus for comparing a first record to a second record wherein said first and second records have a plurality of fields comprising:
   an arithmetic comparator means for comparing each of said plurality of fields of said first record to each corresponding one of said plurality of fields of said second record in order to produce a like plurality of arithmetic comparison results;
   storing means for storing a plurality of user specified expected results to said arithmetic comparator comparing of each of said plurality of fields of said first record to said each corresponding one of said plurality of fields of said second record;
   logical comparator means, respectively coupled to said arithmetic comparator means for receiving said plurality of arithmetic comparison results and to said storing means for receiving said user specified expected results, for comparing said plurality of arithmetic comparison results from said arithmetic comparator to said plurality of user specified expected results from said storing means wherein the output of said logical comparator means is true for each one of said plurality of fields if one said plurality of arithmetic comparison results is the same as a corresponding one of said plurality of said user specified expected results and wherein the output of said logical comparator means is false for each one of said plurality of fields if one said plurality of arithmetic comparison results is not the same as a corresponding one of said plurality of said user specified expected results; and Boolean evaluator means, respectively coupled to said logical comparator means for receiving the true and the false results thereof, for determining said first record to be a hit if a user supplied Boolean expression is satisfied by said true and false results output of said logical comparator means and for determining said first record to be a miss if said user supplied Boolean expression is not satisfied by said true and false results output of said logical comparator means.

3. An apparatus according to claim 2 further comprising:

field format register means for defining length and position within said first record of each of said plurality of fields;

and wherein said arithmetic comparator means further comprise:

arithmetic comparator means responsively coupled to said field format register means for receiving therefrom said length and said position within said first record of each of said plurality of fields, and for locating said each of said plurality of fields of said first record in accordance with said length and said position.

4. Apparatus according to claim 2 or 3 wherein said storing means further comprises:

a field comparison register.

* * * * *